US008368984B2

(12) United States Patent
Yeh et al.

(10) Patent No.: US 8,368,984 B2
(45) Date of Patent: Feb. 5, 2013

(54) PSEUDO BIPOLAR MEMS RIBBON DRIVE

(75) Inventors: Richard Yeh, Sunnyvale, CA (US); David M Bloom, Jackson, WY (US)

(73) Assignee: Alces Technology, Inc., Jackson, WY (US)

( * ) Notice: Subject to any disclaimer, the term of this patent is extended or adjusted under 35 U.S.C. 154(b) by 370 days.

(21) Appl. No.: 12/910,072

(22) Filed: Oct. 22, 2010

(65) Prior Publication Data

US 2012/0099171 A1 Apr. 26, 2012

(51) Int. Cl.
*G02B 26/08* (2006.01)
*G02B 26/00* (2006.01)

(52) U.S. Cl. .................. 359/199.2; 359/200.6; 359/290; 359/900

(58) Field of Classification Search ............... 359/199.2, 359/200.6, 224.1–224.2, 290–291, 900; 310/309
See application file for complete search history.

(56) References Cited

U.S. PATENT DOCUMENTS 6,775,047 B1 * 8/2004 Leung et al. .................. 359/290

* cited by examiner

*Primary Examiner* — James Phan
(74) *Attorney, Agent, or Firm* — NUPAT, LLC; Morrison Ulman

(57) ABSTRACT

A pseudo bipolar method for driving a MEMS ribbon device reduces charging effects in the device.

19 Claims, 5 Drawing Sheets

A

B

PSEUDO BIPOLAR MEMS RIBBON DRIVE

TECHNICAL FIELD

The disclosure is generally related to the field of electrical drive methods for microelectromechanical systems (MEMS) optical ribbon devices.

BACKGROUND

MEMS ribbon devices are used in several kinds of high speed light modulators including grating light valves, interferometric MEMS modulators, MEMS phased arrays, and MEMS optical phase modulators. Each of these light modulator technologies may be employed in personal display, projection display or printing applications, as examples.

MEMS ribbons are made in a variety of shapes and sizes depending on the specific application for which they are designed; however, a typical ribbon may be roughly 50-350 microns long, 2-10 microns wide, and 0.1-0.3 microns thick. Ribbons are suspended roughly 0.2-0.5 microns apart from a substrate to which they may be attracted through the application of an electric field. Ribbons of these approximate dimensions are capable of moving between rest and deflected positions in as little as a few tens of nanoseconds.

The high speed of MEMS ribbon devices has led to display designs in which a linear array of ribbons modulates a line image that is scanned across a viewing area. The ribbons move so fast that a linear array of them can create a sequence of line images to form a two-dimensional image without any perception of flicker by a human observer. Modulating light with linear, rather than two-dimensional, arrays also leads compact modulators that make efficient use of valuable silicon chip real estate.

MEMS linear-array light modulators are thus attractive candidates for integration with CMOS manufacturing processes. A MEMS linear-array may even be considered to be an optical output stage for an integrated circuit. Many CMOS electronic driver chips operate with unipolar supply voltages, however, and unipolar drive does not always work well with ribbon devices. In extreme cases ribbons driven from a unipolar power supply fail to respond after just a few minutes of operation.

What are needed, therefore, are robust methods to drive MEMS ribbon devices using unipolar power supplies so that ribbons and CMOS electronics can be tightly integrated.

DETAILED DESCRIPTION

Figure 1:
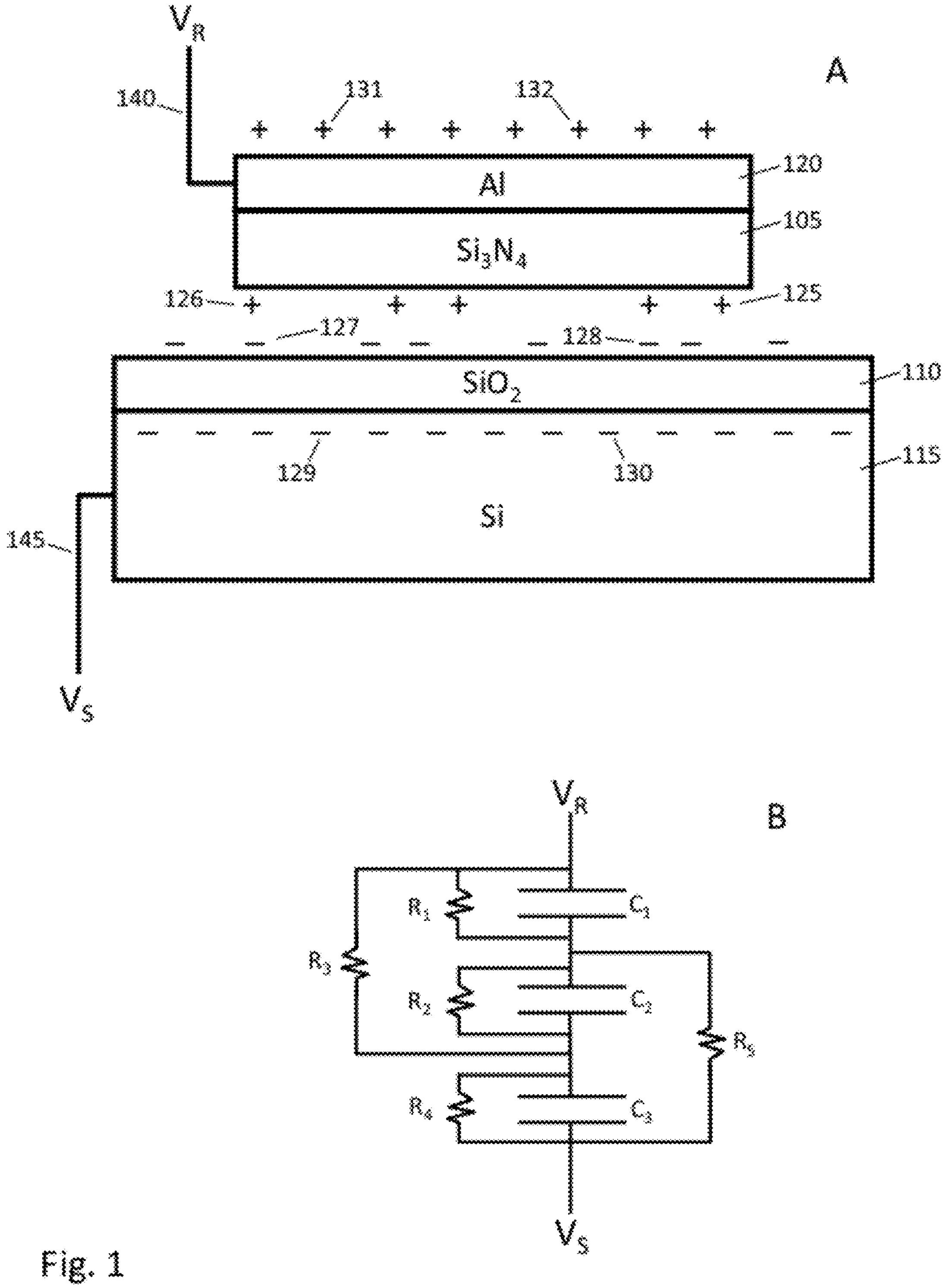
FIG. 1A is a cross sectional sketch of a MEMS ribbon and substrate.
FIG. 1B is an equivalent circuit for the structure shown in FIG. 1A.

Pseudo bipolar MEMS ribbon drive methods described below are designed to avoid difficulties that may otherwise arise when unipolar CMOS electronics are used to drive MEMS ribbon devices. MEMS ribbon devices are typically made using high temperature silicon semiconductor fabrication processes that include deposition of high-stress, stoichiometric silicon nitride ($Si_3N_4$). It is unusual to use high-stress layers in MEMS; however, in the case of a ribbon, the high tensile stress of stoichiometric silicon nitride is the source of tension that allows the ribbon to move quickly.

Ribbons are attracted to a substrate when a voltage is applied between the two. The force exerted on the ribbon is proportional to the square of the electric field created. Because silicon nitride is an insulator, the gap between a ribbon and a silicon dioxide substrate layer has no conductor adjacent to it. Dielectrics on either side of the gap accumulate surface charges when a voltage is applied between the ribbon and the substrate. These surface charges change the strength of the electric field in the gap and movement of the ribbon for a given applied voltage varies over time.

Surface charges accumulate when voltages applied to a ribbon are always of the same sign. Simple drive circuits with unipolar power supplies contribute to this effect. However, because force is independent of the sign of the field, fields of opposite direction but equal magnitude create equal ribbon deflection. Therefore surface charge accumulation effects may be reduced by operating with fields pointing one direction (e.g. from ribbon to substrate) part of the time and the opposite direction at other times. These principles and details of pseudo bipolar MEMS ribbon drive methods are now discussed in detail in concert with the accompanying figures.

FIG. 1A is a cross sectional sketch of a MEMS ribbon and substrate. In the Figure, high-stress, stoichiometric silicon nitride 105 is the structural layer in a MEMS ribbon. The ribbon is separated by a small gap from a silicon substrate 115 upon which a silicon dioxide layer 110 has been grown. Aluminum conductive layer 120 may be deposited on the nitride ribbon during back-end processing after high-temperature steps are complete. (Other processes may be used to make the same structure.) In one example structure, the ribbon is about 200 microns long and about 3 microns wide; the thicknesses of the layers are approximately: aluminum, 600 Å; stoichiometric silicon nitride, 1500 Å; and, silicon dioxide, 2 microns. The air gap between the nitride and oxide layers (previously filled by an amorphous silicon sacrificial layer) is about 0.4 microns. (These dimensions are provided only to offer a sense of the scale involved; they are not intended to be limiting.)

Plus (+) and minus (−) signs in FIG. 1A, such as 125, 126, 127, 128, 129, 130, 131, and 132 indicate accumulation of electric charges in the structure. In particular, surface charges, such as 125, 126, 127, and 128 in the gap between ribbon and substrate, change the magnitude of the electric field that results from a potential difference between $V_R$, applied to the aluminum layer via connection 140, and $V_S$, applied to the silicon substrate via connection 145. When a unipolar drive circuit is used, $V_R$ is always greater than (or always less than) $V_S$. When a bipolar or pseudo bipolar drive circuit is used, the situation alternates between $V_R > V_S$ and $V_R < V_S$.

FIG. 1B is an equivalent circuit for the structure shown in FIG. 1A. In FIG. 1B, $V_R$ and $V_S$ are voltages applied to the ribbon and substrate, respectively, as in FIG. 1A. Capacitors $C_1$, $C_2$ and $C_3$ represent the capacitances of the nitride layer, air gap and oxide layer, respectively. There are several high resistance current leakage paths represented by resistors in the circuit as follows: $R_1$, leakage around the edges of nitride layer; $R_2$, leakage across the air gap; $R_3$, leakage from the aluminum layer to the oxide layer; $R_4$, leakage along the surface of the oxide layer; and $R_5$, leakage from the nitride layer to the silicon substrate. Other leakage paths, and effects due to trapped charges in dielectric layers, are possible and may result in accumulation of surface charges with signs opposite those illustrated in FIG. 1.

In practice, it may be difficult to identify precise values for $C_1$ through $C_3$ and $R_1$ through $R_5$, but if the entire structure is considered to be a single parallel plate capacitor with one leakage resistance, then its charging time constant is $\tau=R_{leak}C_{air}$. In one example structure, $\tau\sim10^3$ seconds.

Figure 2:
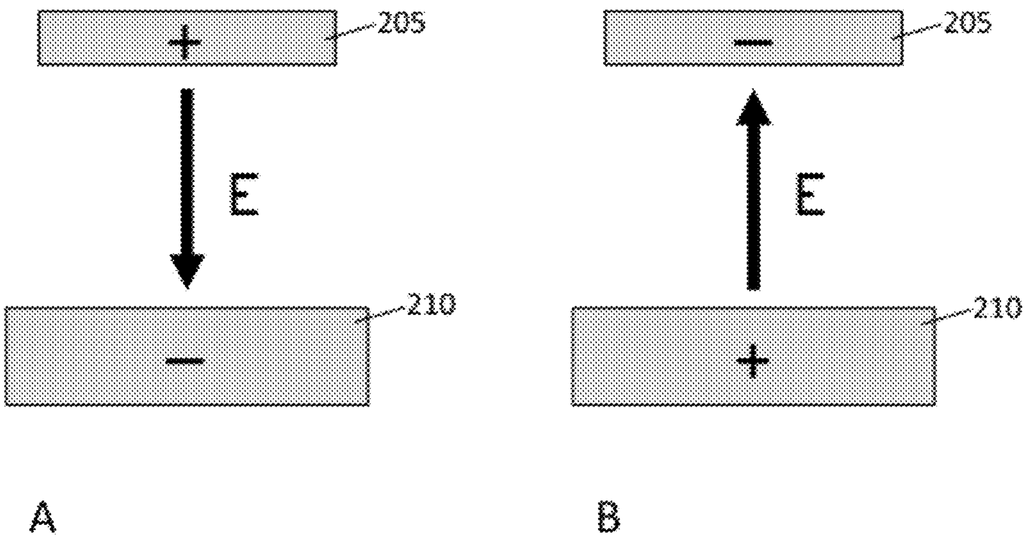
FIGS. 2A and 2B illustrate the direction of an electric field between a ribbon and a substrate under different conditions.

FIGS. 2A and 2B illustrate the direction of an electric field between a ribbon and a substrate under different conditions. In FIG. 2, a schematic cross section of a ribbon 205 is shown near a substrate 210. In FIG. 2A, a voltage between the ribbon and the substrate has made the ribbon more positively charged than the substrate and the direction of the resulting electric field, E, is from ribbon to substrate. In FIG. 2B, the opposite is true: a voltage between the ribbon and the substrate has made the substrate more positively charged than the ribbon and the direction of the resulting electric field, E, is from substrate to ribbon. If the magnitude of E is the same, however, then the force proportional to $E^2$ acting between the ribbon and the substrate is the same in both FIGS. 2A and 2B.

When a bipolar power supply is available, switching between the scenarios of FIG. 2A and FIG. 2B is a matter of connecting voltage sources of different polarity to the ribbon while the substrate remains grounded, as an example. When only a unipolar power supply is available, a similar effect may be obtained by controlling the potential of both the ribbon and the substrate rather than leaving the substrate always at ground. This mode of operation is called “pseudo bipolar”.

Figure 3:
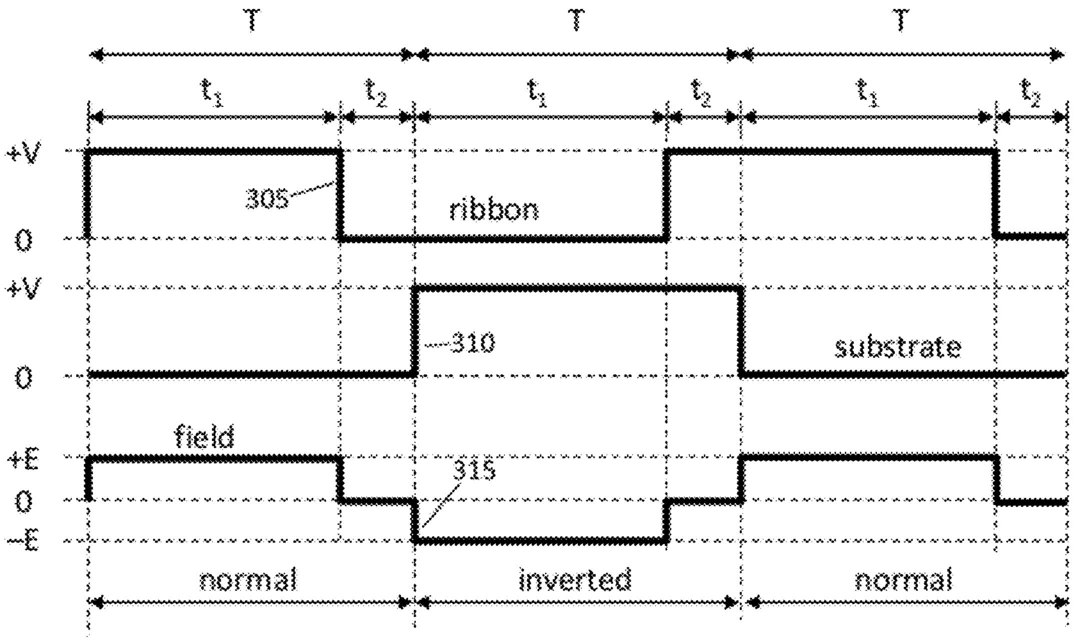
FIG. 3 shows graphs of voltages and fields in a pseudo bipolar, 50% discharge duty cycle drive scenario with flyback time.

FIG. 3 shows graphs of voltages and fields in a pseudo bipolar, 50% discharge duty cycle drive scenario with flyback time. In FIG. 3, graph 305 shows ribbon voltage versus time, while graph 310 shows substrate voltage versus time. Graph 315 plots the strength and polarity of electric field between a ribbon and the substrate. Starting from the left hand side of the figure with time increasing to the right, voltage +V is applied to a ribbon for a duration $t_1$. During this time the substrate voltage is zero and the electric field in the direction from the ribbon to the substrate is positive with magnitude E. Next, for a duration $t_2$, voltages applied to the ribbon and substrate are both zero, as is the electric field between them. Next, voltage +V is applied to the substrate for a duration $t_1$. During this time the ribbon voltage is zero and the electric field in the direction from the ribbon to the substrate is negative with magnitude E. Next, for a duration $t_2$, voltages applied to the ribbon and substrate are both +V, and the electric field between is zero. After that, the cycle repeats.

In FIG. 3, times $t_1$ are those when a ribbon is deflected by electrostatic force proportional to the square of the electric field created between the ribbon and the substrate. During alternating $t_1$ times the direction of the electric field is opposite. This characteristic of the drive scheme reduces or eliminates the accumulation of surface charges in a ribbon device. The discharge duty cycle is 50% because the electric field points in each of two directions half the time. Time $t_1$ is referred to as a “frame” time; it is a time when image data determines which ribbons in an array are deflected and by what amount. In one example design, $t_1$ is about 14 ms. During times $t_2$, the voltages applied to the ribbon and the substrate are equal and therefore the electric field is zero and surface charges do not accumulate. Time $t_2$ is referred to as a “flyback” time; it is a time when ribbons are undeflected and scanning mirrors or other scanning mechanisms can return to their starting point. In one example design, $t_2$ is about 3 ms.

In FIG. 3 the frame data is simply maximum ribbon deflection for the entire frame time which leads to a rather boring, all white image. The data for an actual image would contain a complicated modulation pattern during the frame time. FIG. 3 illustrates the polarity of the ribbon deflection signals regardless of the complexity of the image data, however.

If the image data were significantly different from one frame to the next, the drive scheme of FIG. 3 might still lead to charging effects. In practice, this is a small effect; however, it may be eliminated by displaying each image frame twice in succession: once with positive ribbon and grounded substrate, once with grounded ribbon and positive substrate. This way the average electric field is always zero regardless of image data. The trade off is that the frame rate has doubled; however, MEMS ribbons move so fast that an increased frame rate can be accommodated depending on the number of pixels to be displayed.

Figure 4:
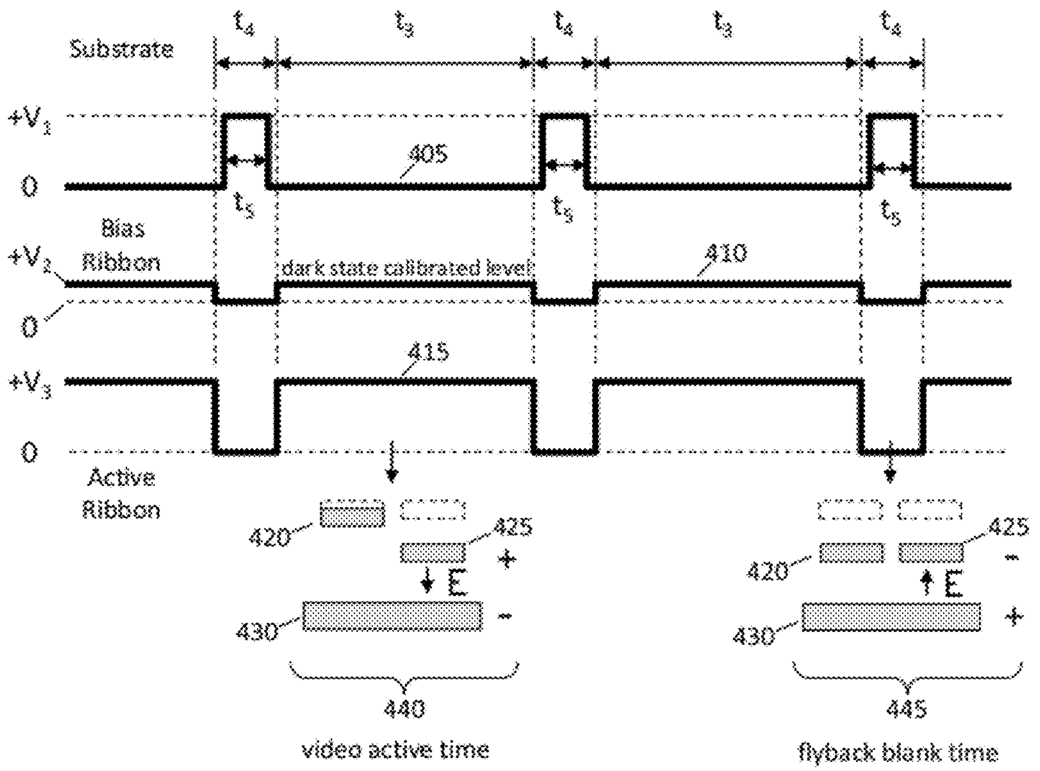
FIG. 4 illustrates voltages in a pseudo bipolar drive scenario with less than 50% discharge duty cycle.

FIG. 4 illustrates voltages in a pseudo bipolar drive scenario with less than 50% discharge duty cycle. In FIG. 4 graph 405 shows substrate voltage versus time while graphs 410 and 415 show voltage versus time for two adjacent ribbons: a “bias” ribbon and an “active” ribbon, respectively. The bias ribbon 420, active ribbon 425 and substrate 430 are shown schematically at 440 during a video active time and at 445 during flyback blank time.

Not all ribbon array devices use bias and active ribbons. When used, a bias ribbon takes the place of a fixed ribbon to provide a way to make fine, static adjustments to dark levels in a video display system. The bias ribbon stays still during video active time. Its movement during flyback blank time is a byproduct of the pseudo bipolar drive scheme described below.

Starting from the left hand side of FIG. 4 with time increasing to the right, the substrate is equal to zero, voltage $+V_2$ is applied to the bias ribbon, and voltage $+V_3$ is applied to the active ribbon. This is the condition for a maximum brightness pixel during a video active time. Next, for a duration $t_4$, the bias and active ribbons are at zero voltage. Within this flyback blank time $t_4$, for a duration $t_5$, voltage $+V_1$ is applied to the substrate. Next, during video active time $t_3$, the situation returns to positive voltages applied to bias and active ribbons with zero voltage applied to the substrate.

During video active times $t_3$, bias ribbon 420 is deflected slightly to calibrate a dark level while active ribbon 425 is deflected according to video data to be displayed. At 440, the active ribbon is depicted at maximum deflection consistent with the application of maximum voltage $+V_3$. During flyback blank times $t_4$, bias and active ribbons are deflected the same amount ensuring a dark state. The direction of the electric field is opposite during flyback blank time compared to video active time, thus reducing surface charge accumulation. The time $t_5$ during which a voltage is applied to the substrate is slightly shorter than the entire flyback blank time $t_4$ to reduce the possibility of spurious light signals at the beginning or end of a frame. In one example design, $t_3$ is about 14 ms, $t_4$ is about 3 ms and $t_2$ is about 2 ms. The discharge duty cycle is $t_5/(t_3+t_4)$ or about 12% in this case. (Discharge duty cycle is defined as the fraction of time during which the electric field points in one particular direction during a video active/flyback blank cycle. The discharge duty cycle is 50% or less by definition.)

The pseudo bipolar drive scheme of FIG. 4 has provided good experimental results despite the discharge duty cycle being less than 50%. In some MEMS ribbon array devices lookup tables are used to remember how much voltage is required to deflect a ribbon by a desired amount. The pseudo bipolar drive scheme of FIG. 3 may require two such lookup tables; one for positive ribbon voltages and one for positive substrate voltages. In the pseudo bipolar drive scheme of FIG.

4, however, only one lookup table is required as the active ribbon always has a positive voltage applied to it during video active times.

In some cases, the pseudo bipolar drive scheme of FIG. 3 may also be operated with only one lookup table by taking advantage of the properties of binary arithmetic. If ribbon deflection levels for a display are represented by an N-bit binary number, for example, then such levels for alternating polarity frames are related by subtraction from the binary representation of $2^N-1$. As an example, if the voltage required to deflect a ribbon by a desired amount during ribbon-positive, substrate-grounded operation is represented by {10101101}, then the corresponding voltage required to deflect the ribbon by the same amount during ribbon-grounded, substrate-positive operation is represented by {01010010}. The difference between the two frames may be determined by exchanging 1 for 0 and vice versa in the binary representations of ribbon deflection voltages.

Prevention of charge accumulation in the pseudo bipolar drive scheme of FIG. 4 depends on the relationship between $V_1$ and $V_3$. Usually, $V_1$ is chosen to be the maximum voltage available on chip, e.g. the supply voltage, while $V_3$ varies constantly with video content. In general, the greater the difference between $V_1$ and $V_3$, the shorter $t_5$ can be while still preventing surface charge accumulation.

Figure 5:
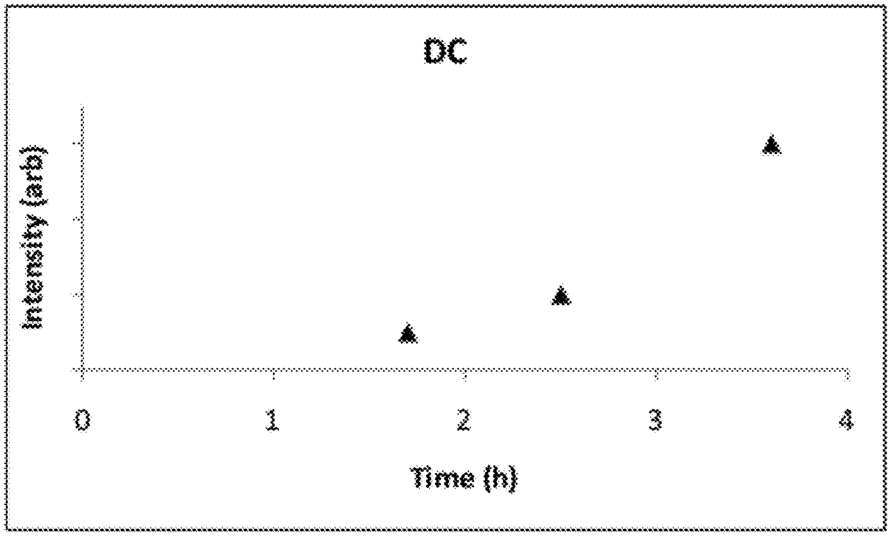
FIGS. 5A and 5B show charge test data.
Figure 5:
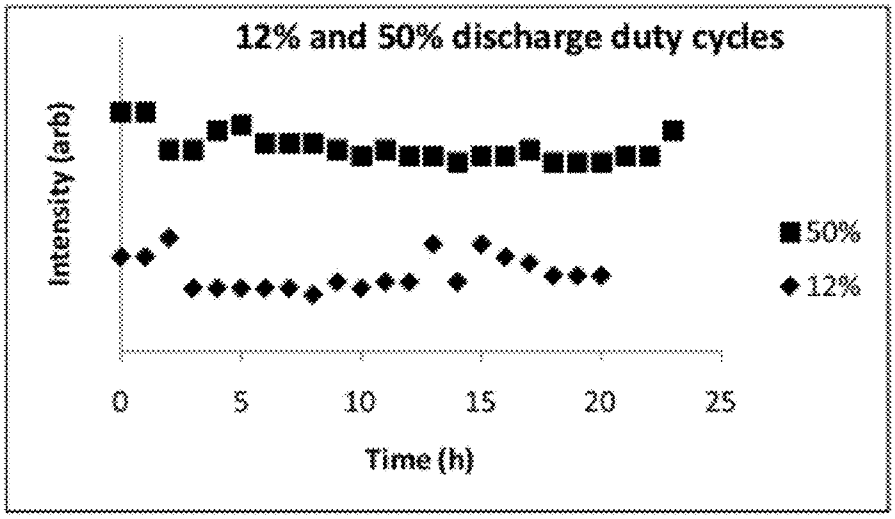

FIGS. 5A and 5B show charge test data. FIG. 5A shows data for a ribbon with a constant voltage applied to it with respect to a substrate. FIG. 5B shows data for ribbons driven according to 50% and 12% discharge duty cycle, pseudo bipolar drive schemes illustrated in FIGS. 3 and 4, respectively. In both figures the horizontal axis is time in units of hours while the vertical axis is pixel intensity of a ribbon-based light modulator. The pixel intensity is directly related to ribbon deflection.

In FIG. 5A, triangles indicate data points acquired at approximately 1.75, 2.5 and 3.5 hours after a constant voltage applied to a ribbon was turned on. Ribbon deflection in response to the constant applied voltage steadily increases as time passes. After 3.5 hours the ribbon in this test no longer responded to changes in applied voltage. The accumulation of surface charges became too great.

In FIG. 5B, squares indicate data points acquired for a ribbon under a 50% discharge duty cycle and diamonds indicate data points acquired for a ribbon under a 12% discharge duty cycle, in both cases over a period of more than 20 hours. The intensity units in FIG. 5B are arbitrary and there is no significance to the fact that the square data points appear at higher intensity than the diamond data points. Both sets of data points show that pseudo bipolar drive schemes lead to consistent ribbon deflection versus applied voltage over several hours. At the end of each test the ribbons responded to applied voltages just as they had at the beginning of the tests.

The embodiments of pseudo bipolar drive schemes have been described in terms of positive voltages with respect to ground. Clearly, however, negative voltages may be used.

In conclusion pseudo bipolar MEMS ribbon drive methods described above are designed to avoid difficulties that may otherwise arise when unipolar CMOS electronics are used to drive MEMS ribbon devices. Surface charge accumulation in MEMS ribbon structures is reduced or eliminated so that ribbons may be controlled by electrical signals indefinitely with no degradation in ribbon response.

The above description of the disclosed embodiments is provided to enable any person skilled in the art to make or use the disclosure. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for driving a MEMS ribbon device comprising:

providing a MEMS ribbon device having a set of ribbons and a common electrode, the device characterized by charging time constant, τ, when modeled as a capacitor;

sending drive signals to the device in two alternating configurations:

a first configuration in which a first set of signals are represented by a first set of ribbon voltages and a first constant common electrode voltage of the same polarity as, and equal to or less in magnitude than, the first set of ribbon voltages; and, a second configuration in which a second set of signals are represented by a second set of ribbon voltages and a second constant common electrode voltage of the same polarity as, and equal to or greater in magnitude than, the second set of ribbon voltages.

2. The method of claim 1 wherein the second set of ribbon voltages are determined by:

(a) determining magnitudes of differences between the first set of ribbon voltages and the first constant common electrode voltage that would be needed to represent the second set of signals in the first configuration; and, (b) subtracting the magnitudes determined in (a) from the second constant common electrode voltage.

3. The method of claim 1 wherein all voltages are positive with respect to ground.

4. The method of claim 1 wherein all voltages are negative with respect to ground.

5. The method of claim 1 wherein the first constant common electrode voltage is approximately zero with respect to ground.

6. The method of claim 1 wherein the second constant common electrode voltage is approximately equal to a supply voltage of a chip upon which the MEMS ribbon device is fabricated.

7. The method of claim 1 wherein the common electrode is a substrate of a chip upon which the MEMS ribbon device is fabricated.

8. The method of claim 1 wherein the first and second sets of signals are different.

9. The method of claim 1 wherein the first and second sets of signals are the same.

10. The method of claim 1 wherein the signals in the first configuration represent image data.

11. The method of claim 1 wherein the signals in the first configuration represent video data.

12. The method of claim 1 wherein the signals in the second configuration represent image data.

13. The method of claim 1 wherein the signals in the second configuration represent video data.

14. The method of claim 1 wherein the signals are in the first configuration 50% of the time and in the second configuration 50% of the time.

15. The method of claim 1 wherein the signals are in the first configuration less than 50% of the time.

16. The method of claim 1 wherein the signals are in the second configuration less than 50% of the time.

17. The method of claim 1 wherein the signals represent image data that are grouped into image frames and each image frame is sent once in the first configuration and once in the second configuration.

18. The method of claim 1 wherein the two signal configurations alternate in a time less than $\tau$.

19. The method of claim 1 wherein the ribbon is in tension due to tensile stress in a stoichiometric silicon nitride layer in the ribbon.

* * * * *